United States Patent
Hong et al.

(10) Patent No.: US 7,943,272 B2
(45) Date of Patent: May 17, 2011

(54) METAL CATALYST AND FUEL CELL EMPLOYING ELECTRODE INCLUDING THE SAME

(75) Inventors: Suk-gi Hong, Yongin-si (KR); Woo-sung Jeon, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1156 days.

(21) Appl. No.: 11/653,968

(22) Filed: Jan. 17, 2007

(65) Prior Publication Data
US 2007/0184334 A1 Aug. 9, 2007

(30) Foreign Application Priority Data
Feb. 7, 2006 (KR) .................. 10-2006-0011835

(51) Int. Cl.
*H01M 4/02* (2006.01)
*H01M 4/04* (2006.01)
*H01M 4/06* (2006.01)
*H01M 4/08* (2006.01)

(52) U.S. Cl. ........ 429/531; 429/524; 429/530; 502/101; 502/300; 427/115

(58) Field of Classification Search .................. 429/42, 429/44; 502/101, 300; 427/115
See application file for complete search history.

(56) References Cited

U.S. PATENT DOCUMENTS

| | | | | | |
|---|---|---|---|---|---|
| 3,518,332 | A | * | 6/1970 | Kobie et al. | 264/49 |
| 4,287,232 | A | * | 9/1981 | Goller et al. | 427/113 |
| 5,723,173 | A | * | 3/1998 | Fukuoka et al. | 427/115 |
| 2004/0166397 | A1 | * | 8/2004 | Valdez et al. | 429/44 |
| 2005/0271932 | A1 | * | 12/2005 | Wang Chen | 429/44 |
| 2006/0057437 | A1 | * | 3/2006 | Finkelshtain et al. | 429/12 |
| 2006/0105226 | A1 | * | 5/2006 | Kim et al. | 429/40 |

FOREIGN PATENT DOCUMENTS

| | | |
|---|---|---|
| CN | 1411618 | 4/2003 |
| CN | 1776947 | 5/2006 |
| JP | 2001-259431 | 9/2001 |
| JP | 2007-209980 | 8/2007 |

OTHER PUBLICATIONS

Japanese Office Action issued Dec. 15, 2009, in a corresponding Japanese patent application.

(Continued)

*Primary Examiner* — Melvin C Mayes
*Assistant Examiner* — Jun Li
(74) *Attorney, Agent, or Firm* — Lee & Morse, P.C.

(57) ABSTRACT

A metal catalyst including a conductive catalyst material and a coating layer formed of a water repellent material on the conductive catalyst material, an electrode including the metal catalyst, and a fuel cell employing the electrode. By forming the coating layer, having a water repellent material, on the conductive catalyst material, the metal catalyst does not sink in the liquid electrolyte, the distribution and movement of the liquid electrolyte around the metal catalyst can be controlled, and the thickness of the interface between the metal catalyst and the liquid electrolyte can be regulated. Accordingly, an ideal electrode structure having triple phase boundary for electrochemical reaction can be formed. A fuel cell employing an electrode including the metal catalyst has excellent efficiency and overall performance.

14 Claims, 3 Drawing Sheets

OTHER PUBLICATIONS

Certificate of Patent No. ZL 200610171273, issued in the corresponding Chinese application by the Chinese Intellectual Property Office on Dec. 9, 2009 (including the Chinese application CN 100566824C).

Gu Jun et al., "Studies on Methods of Fuel Cells Electrodes Preparation", *Electrochemistry*: vol. 5, No. 4, Nov. 1999, pp. 459-462.

Office Action issued by the Patent Office of the People's Republic of China on Mar. 7, 2008 re: Chinese Application No. 2006101712738 (13 pp).

\* cited by examiner

METAL CATALYST AND FUEL CELL EMPLOYING ELECTRODE INCLUDING THE SAME

CROSS-REFERENCE TO RELATED APPLICATION

This application claims the benefit of Korean Patent Application No. 2006-11835, filed on Feb. 7, 2006, in the Korean Intellectual Property Office, the disclosure of which is incorporated herein by reference.

BACKGROUND OF THE INVENTION

1. Field of the Invention

An aspect of the present invention relates to a metal catalyst and a fuel cell employing an electrode including the same, and more particularly, to a metal catalyst having excellent efficiency obtained by controlling an electrolyte around the electrode including the metal catalyst, an electrode having excellent performance by including the metal catalyst, and a fuel cell employing the electrode.

2. Description of the Related Art

A solid polymer electrolyte type fuel cell operating at a high temperature uses a polybenzimidazol electrolyte membrane containing phosphoric acid as an electrolyte. Such a fuel cell uses phosphoric acid as a proton transferring medium, and is thus similar to a liquid electrolyte type fuel cell, such as a phosphoric acid type fuel cell or a molten carbonate fuel cell. Accordingly, in liquid electrolyte type fuel cells, it is difficult to control the distribution and movement of a liquid electrolyte in an electrode of a solid polymer electrolyte type fuel cell operating at a high temperature.

To easily control the distribution and movement of a liquid electrolyte in an electrode of a conventional liquid electrolyte type fuel cell, polytetra fluoroethylene is used as a binder, or the pore size of an electrode is regulated. However, even in this case, catalysts in the electrode cannot be used efficiently.

SUMMARY OF THE INVENTION

An aspect of the present invention provides a metal catalyst having excellent efficiency obtained by efficiently controlling an electrolyte around an electrode including the metal catalyst, an electrode having excellent performance by including the metal catalyst, and a fuel cell employing the electrode.

According to an aspect of the present invention, there is provided a metal catalyst including: a conductive catalyst material; and a coating layer formed of a water repellent material on the surface of the conductive catalyst material.

According to an aspect of the present invention, the amount of the water repellent material may be in the range of 1 to 50 parts by weight based on 100 parts by weight of the conductive catalyst material.

According to another aspect of the present invention, there is provided a method of preparing a metal catalyst including a conductive catalyst material and a coating layer formed of a water repellent material on the surface of the conductive catalyst material, the method including: obtaining a water repellent material solution by mixing a water repellent material and a first solvent; obtaining a conductive catalyst solution by mixing a conductive catalyst material in the first solvent; dripping the conductive catalyst solution into the water repellent material solution; dripping into a second solvent the result obtained by dripping the conductive catalyst solution into the water repellent material solution; and removing the first and second solvent by drying the product obtained by dripping into the second solvent the result obtained by dripping the conductive catalyst solution into the water repellent material solution.

According to an aspect of the present invention, the first solvent may include at least one of water, hydrofluoropolyester, N-methylpyrrolidone, dimethylacetamide, dimethylformamide, and trifluoroacetic acid. Also, the second solvent may include at least one of water and hexane.

According to another aspect of the present invention, there is provided an electrode including the metal catalyst described above.

According to another aspect of the present invention, the electrode may further include at least one of polyvinylidenefluoride and a vinylidenefluoride-hexafluoroprophylene copolymer.

According to another aspect of the present invention, there is provided a method of preparing an electrode including: obtaining a composition for forming a catalyst layer by mixing the metal catalyst with a binder and a third solvent; coating the composition for forming a catalyst layer on an electrode supporter and drying the composition for forming a catalyst layer; and treating the result with an acid solution.

According to another aspect of the present invention, there is provided a fuel cell including: a cathode; an anode; and an electrolyte membrane interposed between the cathode and the anode, wherein at least one of the cathode and the anode includes the metal catalyst described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
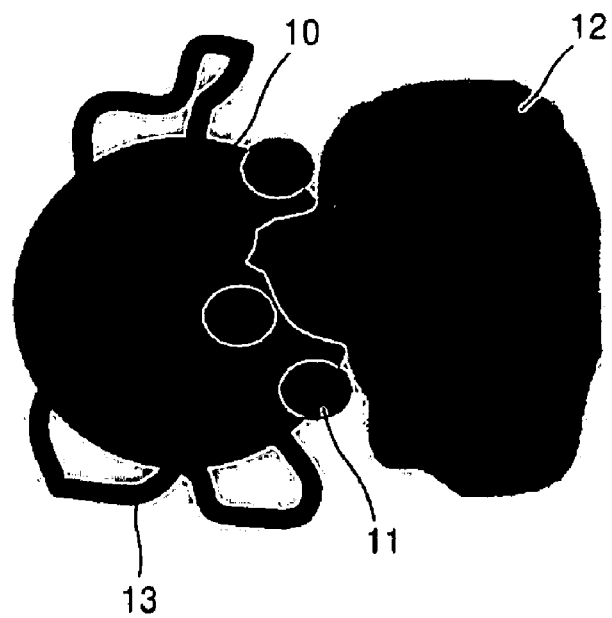
FIGS. 1A and 1B are schematic diagrams of a metal catalyst according to an embodiment of the present invention and a conventional metal catalyst, respectively.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A metal catalyst according to an embodiment of the present invention includes a conductive catalyst material, a coating layer formed of a water repellent material on the surface of the conductive catalyst material, and a liquid electrolyte such as phosphoric acid. Such a structure prevents the metal catalyst from sinking in the liquid electrolyte when a liquid electrolyte membrane is formed thinly and uniformly on the metal catalyst. Accordingly, the dissolution of gas reactors is accelerated, ensuring excellent efficiency of the metal catalyst. Also, cell performance is improved by a catalyst layer employing the metal catalyst.

The water repellent material includes at least one material selected from the group consisting of a 2,2-bistrifluoromethyl-4,5-difluoro-1,3-dioxol tetra fluoroethylene copolymer, polytetra fluoroethylene, fluoridized ethylene propylene, polyvinylidenefluoride, and FLUOROSARF (manufactured by Fluoro Technology).

2,2-bistrifluoromethyl-4,5-difluoro-1,3-dioxol tetrafluoroethylene copolymer, commercially known as TEFLON AF 2400 (manufactured by DuPont), may be used as the water repellent material. The 2,2-bistrifluoromethyl-4,5-difluoro-1,3-dioxol tetrafluoroethylene copolymer is water repellent and porous, and thus, when coated on the surface of a catalyst layer, prevents phosphoric acid from flooding the catalyst layer and forms a path for oxygen to move to the catalyst layer.

The amount of the water repellent material in the coating layer is in the range of 1 to 50 parts by weight based on 100 parts by weight of the conductive catalyst material. When the amount of the water repellent material is less than 1 part by weight, the water repellency is not sufficient, resulting in catalysts that sink in the liquid electrolyte such as phosphoric acid. Accordingly, the efficiency of the metal catalyst deteriorates. When the amount of the water repellent material is greater than 50 parts by weight, the water repellency is too high, blocking the liquid electrolyte. Accordingly, the efficiency of the metal catalyst is low and electrical resistance increases.

The conductive catalyst material is selected from the group consisting of platinum (Pt), iron (Fe), cobalt (Co), nickel (Ni), ruthenium (Ru), rhodium (Rh), palladium (Pd), osmium (Os), iridium (Ir), copper (Cu), silver (Ag), gold (Au), tin (Sn), titanium (Ti), chromium (Cr), a mixture thereof, an alloy thereof, and carbon containing the same.

The conductive catalyst material may be a carbon platinum/carbon (Pt/C) catalyst and the water repellent material may be FLUOROSARF.

The structure of the metal catalyst according to the current embodiment of the present invention will now be described with reference to FIG. 1A. Here, the platinum/carbon (Pt/C) catalyst is used as the conductive catalyst material and FLUOROSARF is used as the water repellent material.

In the metal catalyst, platinum particles 11 are formed on the surface of carbon 10 and a water repellent material 13 is coated on the resulting structure. Also, the surface of the metal catalyst where the repellent material 13 is not coated is formed of phosphoric acid 12.

Figure 1B:
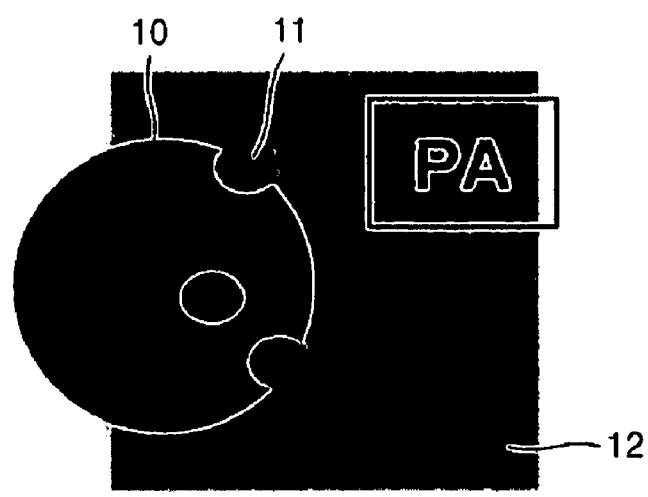

FIG. 1B is a schematic diagram of a conventional metal catalyst.

Referring to FIG. 1B, platinum particles 11 are formed on the surface of carbon 10 and phosphoric acid 12 is formed near the surface of the carbon 10. When the metal catalyst has such a structure, the metal catalyst sinks in the liquid electrolyte, deteriorating the efficiency of the metal catalyst.

The coating of the water repellent material on Pt/C powder as the conductive catalyst material can be performed through polymer precipitation by phase separation.

The water repellent material is completely dissolved in a first solvent (for example, hydrofluoropolyester),a good solvent, to prepare a first solution. At the same time, a second solution is prepared by mixing Pt/C powder and the first solvent in a separate container. Then the first solution and the second solution are stirred and mixed uniformly. Next, the mixture is titrated in a second solvent (for example, water or hexane), a nonsolvent, in which the water repellent material is not soluble. Accordingly, phase separation is induced between the good solvent and the non solvent, thus causing the water repellant material to form a coating layer on the Pt/C powder. At this time, the thickness and the degree of adsorption of the coating layer precipitated on the Pt/C power due to phase separation can be controlled by the rotational speed of an agitator and the intensity of ultrasonic waves used.

The rotational speed of the agitator can be about 250 RPM, the intensity of ultrasonic waves can be 0.3 kW, and the coating of the coating layer can be performed for 20-30 minutes.

Hereinafter, a method of preparing a metal catalyst according to an embodiment of the present invention and an electrode including the metal catalyst will be described.

Figure 2:
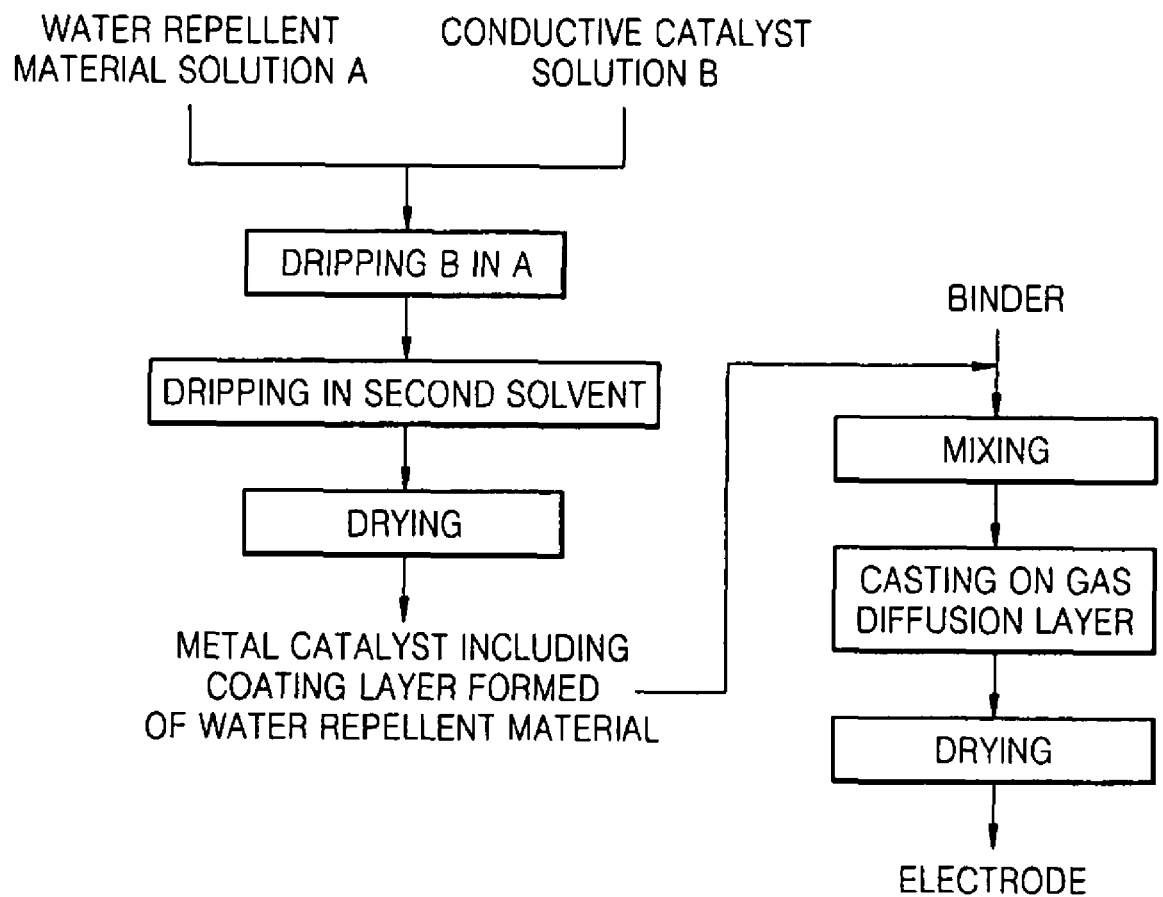
FIG. 2 is a flow chart illustrating a preparation method of an electrode according to an embodiment of the present invention.

FIG. 2 is a flow chart illustrating a method of preparing an electrode according to an embodiment of the present invention.

Referring to FIG. 2, a conductive catalyst solution B and a water repellent material solution A are respectively obtained by separately dissolving a conductive catalyst material and dispersing a water repellent material in a first solvent.

The first solvent is a good solvent that has strong solubility for the water repellent material and strong dispersibility for the conductive catalyst material. Examples of the first solvent include water, hydrofluoropolyester, N-methyl pyrrolidone, dimethylacetamide, dimethylformamide, trifluoroacetic acid, etc. Here, the amount of the first solvent used to disperse the conductive catalyst material is in the range of 200 to 1,000 parts by weight based on 100 parts by weight of the conductive catalyst material. Also, the amount of the first solvent used to dissolve the water repellent material is in the range of 500 to 1,500 parts by weight based on 100 parts by weight of the water repellent material. When the amount of the first solvent is not in the above range, the conductive catalyst material and the water repellent material are not uniformly dissolved or dispersed.

The conductive catalyst solution B is dropwise added to the water repellent material solution A, and then the mixture is titrated into a second solvent.

Accordingly, phase separation is induced, causing the water repellent material, precipitated due to dispersion by stirring and ultrasonic waves, to be physically adsorbed on the surface of the conductive catalyst material. Thus, binding between the conductive catalyst material and the water repellent material is maintained.

The second solvent does not dissolve the water repellent material and has a low boiling point, and thus dries well. Such a solvent is called a nonsolvent. The second solvent includes at least one material selected from the group consisting of water and hexane. The amount of the second solvent may be in the range of 500 to 5,000 parts by weight based on 100 parts by weight of the water repellent material.

The result obtained from the above process is dried by either normal drying at 60 to 150° C. or freeze drying at −20 to −60° C., but the drying is not limited to these processes. In the case of normal drying, when the temperature is outside of the above range, a carbon carrier is oxidized. In the case of freeze drying, when the temperature is outside of the above range, aggregation occurs.

Through the above processes, a metal catalyst including a coating layer formed of the water repellent material on the surface of the conductive catalyst material can be obtained. Due to the phase separation performed in the present embodiment, a discontinuous porous coating layer or continuous coating layer is formed on the surface of the Pt/C catalyst according to the concentration of the water repellent material.

That is, when the concentration of the water repellent material is high, a continuous coating layer is formed. However, when the amount of the water repellent material is less than about 30-35 wt % relative to the water repellent material, a discontinuous porous coating layer is formed.

The metal catalyst is mixed with a binder and a third solvent, and the mixture is cast on a gas diffusion layer. An electrode is obtained by drying the casted result. Here, carbon paper, carbon cloth, or the like is used as an electrode supporter.

Examples of the binder include polyvinylidenefluoride, vinylidenefluoride-hexafluoroprophylene copolymer, etc. The amount of the binder may be in the range of 1 to 10 parts by weight based on 100 parts by weight of the metal catalyst. When the amount of the binder is outside of this range, a catalyst layer is not formed or conductivity is low.

The type and amount of the third solvent depends on the type and amount of the binder. The third solvent includes at least one material selected from the group consisting of N-methylpyrrolidone, dimethylacetamide, dimethyl formamide, and trifluoroacetic acid. Also, the amount of the third solvent is in the range of 100 to 500 parts by weight based on 100 parts by weight of the metal catalyst.

The electrode may be doped with an acid, such as phosphoric acid. When the electrode is doped with the acid, the metal catalyst is prevented from sinking in the acid, and a thin electrolyte membrane is formed on the metal catalyst. Accordingly, dissolution of gas reactors is accelerated, improving the efficiency of the metal catalyst.

Hereinafter, a fuel cell according to an embodiment of the present invention will be described in detail.

The fuel cell includes a cathode, an anode and an electrolyte membrane interposed between the cathode and the anode. Here, at least one of the cathode and anode include the metal catalyst described above.

The fuel cell may be, for example, a phosphoric acid fuel cell, a proton exchange membrane fuel cell, or a direct methanol fuel cell. The structure and manufacturing method of the fuel cell is not specifically limited, and detailed examples are described in various documents. Therefore, a detailed description of the fuel cell is omitted.

An aspect of the present invention will now be described in further detail with reference to the following examples. These examples are for illustrative purposes only, and are not intended to limit the scope of the present invention.

EXAMPLE 1

5 Parts by Weight of a Water Repellent Material Based on 100 Parts by Weight of a Conductive Catalyst Material 0.05 g of FLUOROSARF (manufactured by Fluoro Technology), as a water repellent material, was mixed with 10 ml of hydrofluoropolyester, and the mixture was stirred at 500 RPM for 30 minutes at room temperature to prepare a water repellent material solution.

Separately, 1.0 g of Pt/C was mixed with 10 ml of hydrofluoropolyester and the mixture was stirred at 500 RPM for 10 minutes at room temperature to prepare a Pt/C solution.

The Pt/C solution was dropwise added to the water repellent material solution while the water repellent material solution was exposed to ultrasonic waves. Then the resultant was dropwise added to 50 ml of water. The resultant solution was dried at 120° C. for 12 hours to obtain a Pt/C catalyst including a FLUOROSARF coating layer formed of the water repellent material.

1 g of the Pt/C catalyst was mixed with 0.025 g of polyvinylidenefluoride, as a binder, and 5 ml of N-methylpyrrolidone, as a solvent, and the mixture was stirred for about 30 minutes at room temperature to obtain a slurry for forming a catalyst layer.

The slurry was coated on carbon paper using an applicator (gap: about 120 μm). The result was dried at 80° C. for 1 hour, at 120° C. for 30minutes, and then at 150° C. for ten minutes to prepare an electrode.

The electrode was treated with phosphoric acid for use in a fuel cell. The fuel cell included a cathode containing the Pt/C catalyst, an anode and a polybenzimidazol electrolyte membrane. Also, hydrogen was used as a fuel and air was used as an oxidizer. Pure hydrogen was supplied to the anode at 100 ml/min and air was supplied to the cathode at 200 ml/min. The unit cell operated at 150° C.

Figure 3:
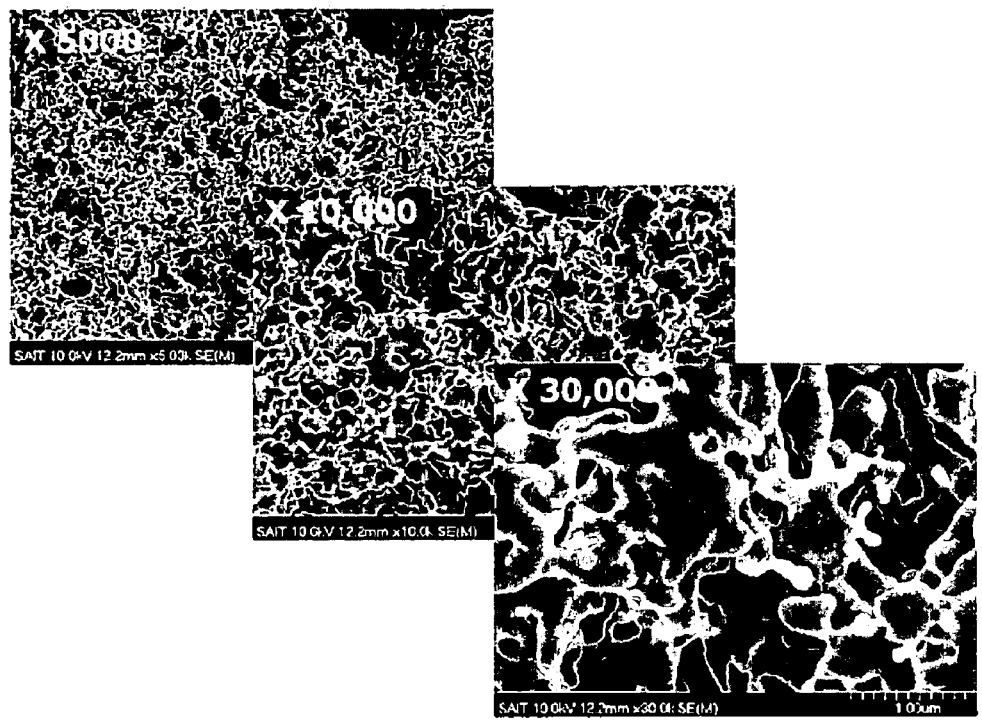
FIG. 3 is a scanning electron microscopic photo of a catalyst according to an embodiment of the present invention prepared according to Example 1.

The Pt/C catalyst including the FLUOROSARF coating layer formed of the water repellent material was examined using a scanning electron microscope and the obtained images are shown in FIG. 3.

Referring to FIG. 3, the water repellent material formed a coating layer on the surface of the Pt/C catalyst.

EXAMPLE 2

15 Parts by Weight of a Water Repellent Material Based on 100 parts by Weight of a Conductive Catalyst Material A metal catalyst, an electrode, and a fuel cell were prepared in the same manner as in Example 1, except that 0.15 g of FLUOROSARF was used instead of 0.05 g while preparing the water repellent material solution.

COMPARATIVE EXAMPLE 1

1 g of Pt/C catalyst was mixed with 0.05 g of polybenzimidazol and 0.025 g of polyvinyllidenefluoride, and the mixture was stirred at room temperature for 30 minutes to obtain a slurry for forming a catalyst layer.

The slurry was coated on carbon paper using an applicator (gap: about 120 μm) and the result was dried at 80° C. for 1 hour, then at 120° C. for 30 minutes, and then at 150° C. for 10 minutes to prepare an electrode.

The electrode was treated with phosphoric acid to form a fuel cell. The fuel cell included a cathode containing the Pt/C catalyst of Comparative Example 1, an anode, and a polybenzimidazol electrolyte membrane. Also, hydrogen was used as a fuel and air was used as an oxidizer.

Figure 4:
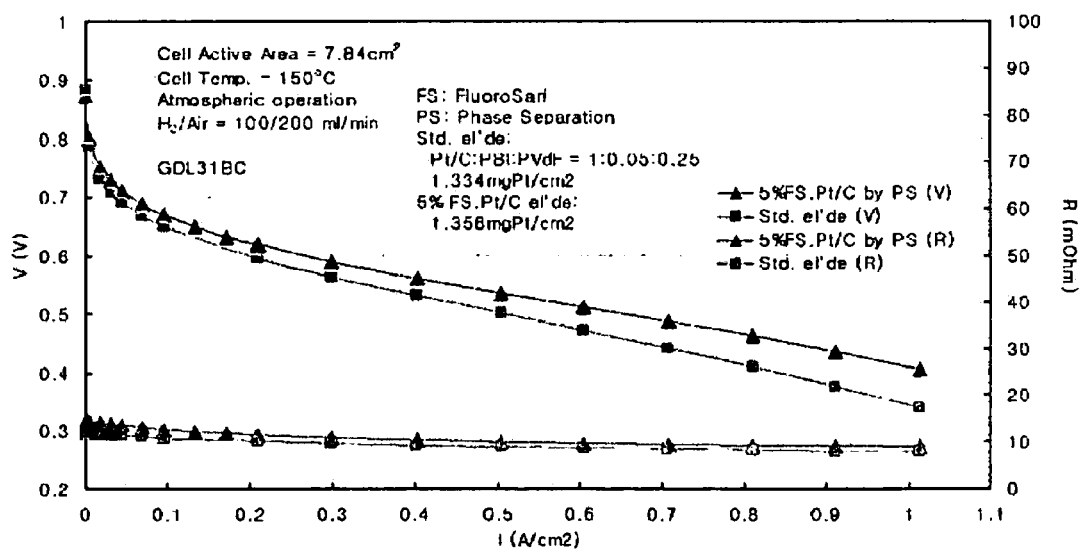
FIG. 4 is a graph illustrating current-voltage (I-V) and current-resistance (I-R) characteristics of electrodes prepared according to Example 1 and Comparative Example 1.

FIG. 4 is a graph illustrating current-voltage (I-V) and current-resistance (I-R) characteristics of the electrodes prepared according to Example 1 and Comparative Example 1. In FIG. 4, -▲- is used to indicate the I-V and I-R characteristics of the electrode of Example 1, and -■- is used to indicate the I-V and I-R characteristics of the electrode of Comparative Example 1.

Referring to FIG. 4, the electrode of Example 1 has superior I-V characteristics to the electrode of Comparative Example 1, especially in a high current density region. Such superior characteristics are due to the improved diffusion of gas reactants obtained by controlling the electrolyte distribution, which is possible due to the coating layer formed of the water repellent material on the catalyst layer. Also, the electrode of Example 1 has relatively high resistance. Such a phenomenon is caused by the coating layer formed of the water repellent material on the surface of the conductive catalyst particle acting as a resistive layer.

An adsorption test was performed on the metal catalysts prepared according to Examples 1 and 2 and Comparative Example 1 to examine the water repellency of the metal catalysts. The results are shown in Table 1. In the adsorption test, a certain quantity of water was poured to flow between the metal catalyst particles, and the amount of water that passed through the metal catalyst particles was measured to obtain the amount of water adsorbed by the metal catalyst particles. The amount of adsorbed water was used to represent the water repellency.

TABLE 1

| Examples (Amount of water repellent material) | Adsorbed water (g) | Amount of adsorbed water (g)/Amount of metal catalyst (g) | Amount of adsorbed water (mol)/Amount of metal catalyst (g) |
| --- | --- | --- | --- |
| Example 1 (5 parts by weight) | 3.2224E−06 | 6.30617E−05 | 3.5034E−06 |
| Example 2 (15 parts by weight) | 0.0000E+00 | 0.0000E+00 | 0.0000E+00 |
| Comparative Example 1 | 2.8284E−05 | 5.5568E−04 | 3.0871E−05 |

Referring to Table 1, as the amount of the water repellent material coated on the Pt/C catalyst increased, the amount of water adsorbed decreased, especially in the case of Example 2, in which case the amount of the water repellent material was 15 parts by weight, and water was not adsorbed by the metal catalyst particles at all.

By forming the coating layer, having a water repellent material, on the conductive catalyst material, the metal catalyst according to an aspect of the present invention does not sink in the liquid electrolyte, the distribution and movement of the liquid electrolyte around the metal catalyst can be controlled, and the thickness of the interface between the metal catalyst and the liquid electrolyte can be regulated. Accordingly, an ideal electrode structure having triple phase boundary for electrochemical reaction can be formed. A fuel cell employing an electrode including the metal catalyst has excellent efficiency and overall performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of preparing a metal catalyst comprising a conductive catalyst material and a coating layer formed of a water repellent material on a surface of the conductive catalyst material, the method comprising:
    mixing a water repellent material and a first solvent to obtain a water repellent material solution, wherein the water repellent material includes at least one of 2,2-bistrifluoromethyl-4,5-difluoro-1,3-dioxol tetrafluoroethylene copolymer, polytetrafluoroethylene, fluoridized ethylene propylene, and polyvinylidenefluoride;
    mixing a conductive catalyst material in the first solvent to obtain a conductive catalyst solution;
    mixing the conductive catalyst solution and the water repellent material solution to obtain a first mixture;
    dripping the first mixture into a second solvent to induce phase separation between the first solvent and the second solvent to cause the water repellent material to form the coating layer on the surface of the conductive catalyst wherein the second solvent being a non-solvent for the water repellent material; and
    removing the first and second solvents by drying the second mixture.

2. The method of claim 1, wherein the first solvent comprises at least one material selected from the group consisting of water, hydrofluoropolyester, N-methylpyrrolidone, dimethylacetamide, dimethylformamide, and trifluoroacetic acid.

3. The method of claim 1, wherein the second solvent comprises at least one material selected from the group consisting of water and hexane.

4. The method of claim 1, wherein the amount of the water repellent material is in the range of 1 to 50 parts by weight based on 100 parts by weight of the conductive catalyst material.

5. The method of claim 1, wherein the amount of the first solvent used to obtain the water repellent material solution is in the range of 500 to 1,500 parts by weight based on 100 parts by weight of the water repellent material, and wherein the amount of the first solvent used to obtain the conductive catalyst solution is in the range of 200 to 1,000 parts by weight based on 100 parts by weight of the conductive catalyst material.

6. The method of claim 1, wherein the amount of the second solvent is in the range of 500 to 5,000 parts by weight based on 100 parts by weight of the water repellent material.

7. The method of claim 1, wherein the drying the second solution comprises drying at a temperature of 60 to 150° C. or freeze drying at a temperature of −20 to −60° C.

8. The method of claim 1, wherein the water repellent material and the first solvent are stirred at 500 RPM for 30 minutes at room temperature to form the water repellent material solution.

9. The method of claim 1, wherein the conductive catalyst material and the first solvent are stirred at 500 RPM for 10 minutes at room temperature to prepare the conductive catalyst solution.

10. A method of preparing an electrode comprising:
    mixing a metal catalyst, including a conductive catalyst material and a coating layer on a surface of the conductive catalyst material, with a binder and a third solvent to obtain a composition;
    coating the composition on an electrode supporter and drying the composition to form the electrode; and
    treating the electrode with an acid solution,
    wherein the coating layer is formed of a water repellent material on a surface of the conductive catalyst material and the coating layer is formed by an induced phase separation between a first solvent and a second solvent when dripping a first mixture into a second solvent that is a non-solvent for the water repellent material, the first mixture including the water repellent material, the conductive catalyst material, and the first solvent, and wherein the water repellent material includes at least one of 2,2-bistrifluoromethyl-4,5-difluoro-1,3-dioxol tetrafluoroethylene copolymer, polytetrafluoroethylene, fluoridized ethylene propylene, and polyvinylidenefluoride.

11. The method of claim 10, wherein the binder comprises at least one material selected from the group consisting of polyvinylidenefluoride and vinylidenefluoride-hexafluoroprophylene copolymer, and the amount of the binder is in the range of 1 to 10 parts by weight based on 100 parts by weight of the metal catalyst.

12. The method of claim 10, wherein the third solvent comprises a material selected from the group consisting of N-methylpyrrolidone, dimethylacetamide, dimethylformamide, and trifluoroacetic acid.

13. The method of claim 10, wherein the acid solution comprises a phosphoric acid solution.

14. The method of claim 10, wherein the composition is dried at 80° C. for 1 hour, at 120° C. for 30 minutes and at 150° C. for ten minutes.

* * * * *